Aug. 24, 1965     H. K. SCHILLING     3,202,252
FLUID PRESSURE OPERATED CLUTCH
Original Filed Nov. 4, 1960

INVENTOR.
HUGH K. SCHILLING
BY
Caswell, Lagaard & Wicks
ATTORNEYS

United States Patent Office 3,202,252
Patented Aug. 24, 1965

3,202,252
FLUID PRESSURE OPERATED CLUTCH
Hugh K. Schilling, St. Paul, Minn., assignor to Horton Manufacturing Co., Inc., Minneapolis, Minn.
Continuation of application Ser. No. 67,360, Nov. 4, 1960. This application Apr. 23, 1963, Ser. No. 278,509
2 Claims. (Cl. 192—85)

This application is a continuation of application Serial No. 67,360 filed November 4, 1960, and now abandoned.

This invention relates to an improvement in clutches and more particularly to fluid operated means for imparting axial pressure on and movement to rotatable elements of the clutch.

It is an object of the invention to provide a fluid operated clutch extremely compact in nature and one in which no bearings are necessary for the cylinder or piston of the clutch. It is also an object to provide a clutch having fluid operated means which assures firm and smooth engagement of the clutch members.

It is also an object to provide a fluid operated clutch having cooling fins on the friction disc. It is a still further object to provide a clutch having means for easily and positively adjusting the take-up space between the friction disc and the friction facing.

It is an additional object to provide a clutch whereby the torque produced may be changed by merely changing the diameter of the cylinder and piston components with the other parts remaining the same size.

It is also an object to provide a clutch utilizing a rotary air union member.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
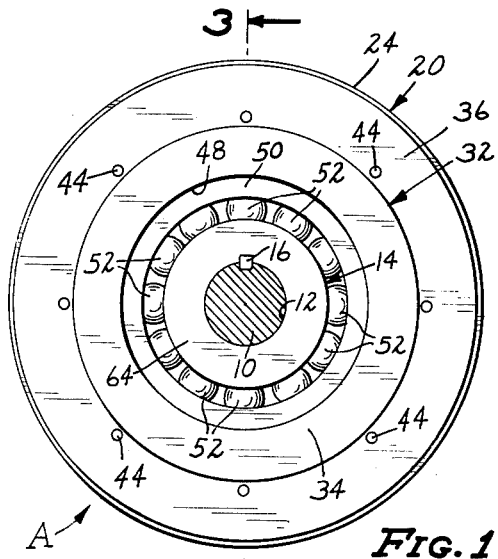
FIGURE 1 is a front end elevational view of a clutch according to the invention.
Figure 2:
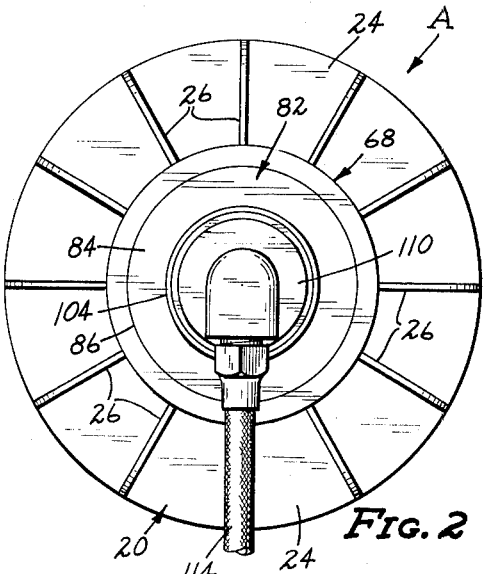
FIGURE 2 is a rear end view thereof.
Figure 3:
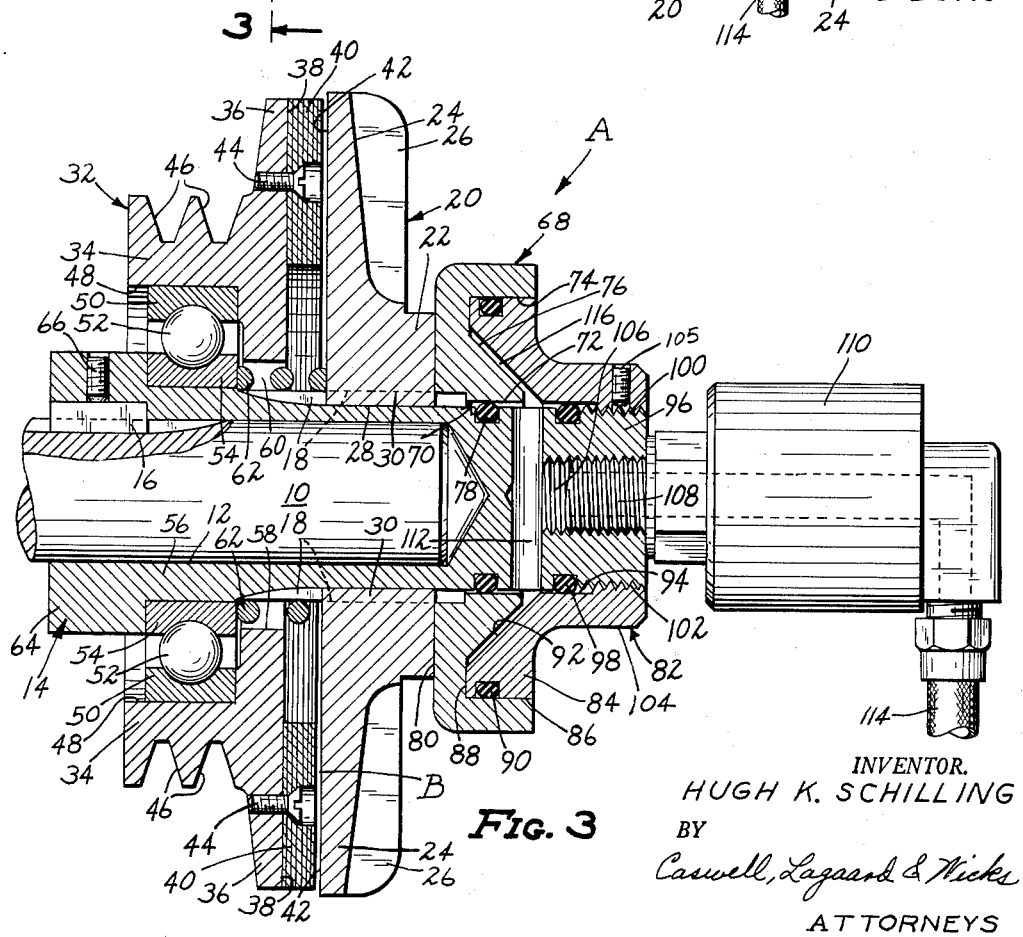
FIGURE 3 is a sectional view on the line 3—3 of FIGURE 1.

Referring to the drawings in detail, the clutch A includes the driven shaft 10 operated by a source of power such as an electric motor. The shaft 10 is positioned within the recess 12 of the hollow shaft 14 and keyed thereto by means of the key 16. The hollow shaft 14 has formed on the outer periphery thereof a number of splines 18. Further provided is the friction disc 20 having the hub portion 22 and the outer flat body portion 24. The outer flat body portion of the friction disc is formed with the radially extending cooling fins 26. The friction disc 20 is formed with the axial hole 28 which has spline formations 30 which slidably interfit with the splines 18 of the hollow shaft 14 thereby slidably mounting the friction disc 20 upon the hollow shaft.

The numeral 32 designates a circular sheave plate member including the hub portions 34 and the circular plate portion 36 formed with the flat face surface 38. Secured to the face 38 of the sheave plate 32 is the friction facing ring 40 adjacent and concentric with the face 42 of the friction disc 20. The friction facing ring 40 is secured by means of the screws 44. The hub portion 34 of the sheave plate 32 is formed with the V-grooves 46 adapted to receive V-belts for driving a device not shown by means of the clutch A. The hub 34 of the plate 32 is also formed with the annular recess 48 into which is press fit the outer race 50 of the radial bearing 52. The inner race 54 of the bearing 52 is press fit on the outer end portion 56 of the hollow shaft 14. The inner portion of the circular plate portion 36 is formed with the axial hole 58 the edge of which is spaced from shaft 14 thereby forming an annular recess 60 within which is mounted the coil spring 62 upon the shaft 14 between the bearing race 54 and the face 42 of the disc 20.

The spring 62 normally urges the friction disc member 20 outwardly of the shaft 14 and away from the friction ring facing 40. Further provided is the enlarged hub portion 64 of the shaft 14 mounting the set screw 66 which secures shaft 14 to shaft 10. The hub 64 aids in holding the bearing 52 in place. It will be seen that the sheave plate member 32 is rotatably mounted on the hollow shaft 14 by means of the bearing 52.

Further provided is the cylinder 68 slidably carried upon the shaft 14 and having an axial hole 70 formed therein defining the annular face 72. The cylinder 68 is also formed with the annular recess 74 terminating in the angularly faced frustro-conical formation 76. The cylinder 68 is slidably mounted on the outer end of the hollow shaft 14, and sealing engagement between face 72 of the hole 70 and the shaft 14 is made by means of the O-ring 78. The inner face surface 80 of the cylinder 68 is in abutting engagement with the outer face of the hub portion 22 of the friction disc 20.

The numeral 82 designates a piston member carried by the outer end of the hollow shaft 14. The piston 82 includes the annular head portion 84 having the outer annular longitudinal wall portion 86 and the transverse end wall portion 88. The wall portion 86 slidably fits within the recess 74 of the cylinder 68, and sealing engagement is made by means of the O-ring 90. Extending from the end wall 88 inwardly and angularly and substantially parallel to the face of the conical formation 76 of the cylinder 68 is the wall facing 92. The facing 92 terminates in the annular sleeve portion facing 94 which makes sealing engagement with the outer surface of the outer end portion 96 of the shaft 14 by means of the O-ring 98. The outer end portion 96 of the shaft 14 is formed with the threads 100 which engage threads 102 formed in the annular base portion 104 of the piston member 82 to thereby secure the piston 82 upon the hollow shaft 14. The set screw 105 locks the piston in place.

As the piston 82 is advanced or retracted by means of the threaded engagement with the shaft end 96, the amount of space at B between the friction ring 40 and the face 42 of the disc 20 is changed through the longitudinal sliding movement of the disc 20 and the cylinder 68.

The shaft end portion 96 is threaded internally as at 106 which receives the threaded end 108 of the conventional rotary air union member 110. The end portion 96 of the hollow shaft 14 is formed with the cross hole 112 which communicates with the threaded hole 106. With the shaft 10 rotated, fluid pressure is introduced in the line 114 connected to the union 110 where it passes therethrough and into the hole 106, thence out the cross hole 112 and into the annular chamber 116 formed between the faces 76 and 92, where pressure moves the cylinder 68 towards and against the disc 20 against the action of the spring 62 thereby engaging the surface 42 thereof with the friction facing ring 40. As a result of such action of the parts, the sheave plate 32 is rotated, the speed of which is determined by the amount of pressure used and the r.p.m. of the shaft 14.

The invention is not to be understood as restricted to the details set forth since these may be modified within the scope of the appended claims without departing from the spirit and scope of the invention.

Having thus described the invention, what is claimed as new and desired to be secured by Letters Patent is:

1. An air operated clutch comprising, driven shaft means having an inward and an outward end and having an axial internal air passageway which opens to the outward end of said shaft means, axially fixed sheave means having secured thereto an annular outward facing friction face and being mounted for free rotation upon said shaft means, driven friction disc means located outward from said friction face and said sheave means and slidably carried by said shaft means for movement into and out of clutching engagement with said friction face of said sheave means, said disc means being rotatably fixed to said shaft means, spring means for normally urging said friction disc means out of engagement with said friction face of said sheave means, means interposed between said outward end of said shaft means and said driven disc means operable to slidably urge said disc means into clutching engagement with said friction face of said sheave means upon the introduction of air under pressure into the passageway of said shaft means, said interposed means including a pressure cylinder slidably carried by and rotatable with said shaft means, said pressure cylinder having a radial surface abuttingly engageable with said disc means and an annular flange extending therefrom, said pressure cylinder further having a conoidal pressure surface terminating at its outer periphery in radially spaced relation to the inner surface of the said annular flange whereby to define therewith an annular pressure surface normal to the longitudinal axis of said shaft means, an axially fixed piston member carried by and rotatable with said shaft means between the outward end thereof and said pressure cylinder, said piston member having an annular outer surface sealingly slidable within the said annular flange of said pressure cylinder and having an annular face normal to the longitudinal axis of said shaft means and abuttingly engageable with said annular pressure surface of said pressure cylinder, said piston member further having a conoidal pressure surface terminating at its outer edge with the said annular face thereof, said conoidal pressure surfaces of said pressure cylinder and said piston member being substantially coextensive with one another and being in closely spaced parallel relation to each other when the said annular face of said piston member is in contact with the said annular pressure surface of said pressure cylinder and defining therebetween an inclined annular pressure passageway, said shaft means having a cross hole formed therethrough and in communication with the internal passageway of said shaft means and said pressure passageway whereby upon the admission of air under pressure thereinto pressure is exerted uniformly upon the entire annular pressure surface and conoidal pressure surface of said pressure cylinder to thereby slidably move said friction disc means into engagement with said friction face of said sheave means and rotate said sheave.

2. An air operated clutch comprising, driven shaft means having an inward and an outward end and having an axial internal air passageway which opens to the outward end of said shaft means, axially fixed sheave means having secured thereto an annular outward facing friction face and being mounted for free rotation upon said shaft means, driven friction disc means located outward from said friction face and said sheave means and slidably carried by said shaft means for movement into and out of clutching engagement with said friction face of said sheave means, said disc means being rotatably secured to said shaft means, spring means for normally urging said friction disc means out of engagement with said friction face of said sheave means, means interposed between said outward end of said shaft means and said driven disc means operable to slidably urge said disc means into clutching engagement with said friction face of said sheave means upon the introduction of air under pressure into the passageway of said shaft means, said interposed means including a pressure cylinder slidably carried by and rotatable with said shaft means, said pressure cylinder having a radial surface abuttingly engageable with said disc means and an annular flange extending therefrom, said pressure cylinder further having an axial annular recess providing an annular pressure surface, an axially fixed piston member carried by and rotatable with said shaft means between said outward end thereof and said pressure cylinder, said piston member having an annular outer surface sealingly slidable within the said annular flange of said pressure cylinder and having an annular face normal to the longitudinal axis of said shaft means and abuttingly engageable with the annular pressure surface of said pressure cylinder, said annular pressure surface and said annular face of said piston defining therebetween an annular passageway, a cross hole formed in said shaft means in communication with the internal passageway of said shaft means and said annular passageway whereby upon the admission of air under pressure thereinto pressure is exerted uniformly upon the entire annular pressure surface of said pressure cylinder to cause said cylinder to move said friction disc means into engagement with said friction face of said sheave means and rotate said sheave.

References Cited by the Examiner
UNITED STATES PATENTS

| | | | |
|---|---|---|---|
| 1,488,736 | 4/24 | Conradson | 188—87 |
| 2,240,741 | 5/41 | Spalding. | |
| 2,282,143 | 5/2 | Carter. | |
| 2,620,054 | 12/52 | Munschauer. | |
| 2,653,833 | 9/53 | Barron. | |
| 2,837,192 | 6/58 | Dunkelow. | |
| 2,920,732 | 1/60 | Richards et al. | 192—87 |

DAVID J. WILLIAMOWSKY, *Primary Examiner.*